United States Patent
Cheng

(10) Patent No.: US 10,058,811 B2
(45) Date of Patent: Aug. 28, 2018

(54) FORCING AND FIXING STRUCTURE FOR THE FILTER CYLINDERS OF A FILTER CYLINDER TYPE DUST COLLECTOR

(71) Applicant: SAN FORD MACHINERY CO., LTD., Taichung (TW)

(72) Inventor: Yuan-Tai Cheng, Taichung (TW)

(73) Assignee: SAN FORD MACHINERY CO., LTD., Taichung (TW)

( * ) Notice: Subject to any disclaimer, the term of this patent is extended or adjusted under 35 U.S.C. 154(b) by 248 days.

(21) Appl. No.: 15/095,671

(22) Filed: Apr. 11, 2016

(65) Prior Publication Data

US 2016/0339374 A1 Nov. 24, 2016

(30) Foreign Application Priority Data

May 20, 2015 (TW) .............................. 104207775 U

(51) Int. Cl.
*B01D 46/00* (2006.01)
*B01D 46/24* (2006.01)
*B01D 46/42* (2006.01)

(52) U.S. Cl.
CPC ....... *B01D 46/0005* (2013.01); *B01D 46/002* (2013.01); *B01D 46/2403* (2013.01); *B01D 46/4227* (2013.01); *B01D 2265/024* (2013.01); *B01D 2267/30* (2013.01); *B01D 2275/20* (2013.01)

(58) Field of Classification Search
CPC .. B01D 46/00; B01D 46/0005; B01D 46/002; B01D 46/2403; B01D 46/4227; B01D 2265/024; B01D 2267/30; B01D 2275/20
USPC .................................... 55/361–382, 490–519
See application file for complete search history.

(56) References Cited

U.S. PATENT DOCUMENTS 4,089,664 A * 5/1978 Noland .................. B01D 46/02
55/341.1

* cited by examiner

*Primary Examiner* — T. Bennett McKenzie
(74) *Attorney, Agent, or Firm* — Ming Chow; Sinorica, LLC

(57) ABSTRACT

A forcing and fixing structure for the filter cylinders of a filter cylinder dust collector includes a housing provided therein with a division plate. Plural twinned setting racks are disposed under the division plate, and plural twinned forcing rods are respectively set on the setting racks, and the forcing rods are respectively and vertically connected with a rotary handle. Further, plural assembling-and-disassembling plates are respectively mounted on each pair of the forcing rods for plurality filter cylinders to be fitted thereon. When the rotary handles are turned to actuate the forcing rods to rotate and drive the assembling-and-disassembling plate to move upward, the filter cylinders can be forced to tight fit with the division plate, thus facilitating assembly and disassembly of filter cylinders, attaining good airtight effect and elevating efficacy of air purification and quality of use of the filter cylinder type dust collector.

6 Claims, 9 Drawing Sheets

FORCING AND FIXING STRUCTURE FOR THE FILTER CYLINDERS OF A FILTER CYLINDER TYPE DUST COLLECTOR

The current application claims a foreign priority to application No. 104207775 filed on May 20, 2015 in Taiwan.

BACKGROUND OF THE INVENTION

1. Field of the Invention

This invention relates to a forcing and fixing structure for filter cylinders, particularly to one installed in a filter cylinder type duct collector.

2. Description of the Prior Art

A conventional filter cylinder type dust collector and a filter cylinder assembling-and-disassembling mechanism are disclosed in FIGS. 1 and 2. The conventional filter cylinder type dust collector is formed with a housing 1 provided therein with a division plate 2, and a motor fan 3 is installed above the division plate 2. The housing 1 is bored with an air outlet 4 at a location corresponding to the motor fan 3 and a pair of rails 5 is provided under the division plate 2 for a filter cylinder assembling-and-disassembling mechanism 6 to slide thereon. Further, the housing 1 has one side bored with an air intake 7 at a location lower than the division plate 2, and the division plate 2 is bored with a plurality of through holes 2a, while the filter cylinder assembling-and-disassembling mechanism 6 is formed with a plurality of insert holes 6a respectively corresponding with the through holes 2a and respectively fitted therein with a filter cylinder 8. Each filter cylinder 8 has its topside formed with a holding member 8a having an upper side bored with a through hole 8b. The housing 1 has another side disposed with a doorway 9 employed for assembling and disassembling the filter cylinders 8, and a door plank can be installed at the doorway 9 after finishing assembly or disassembly of the filter cylinders 8. In addition, the rails 5 are an inclined plane slanting upward from the doorway 9. To assemble the filter cylinders 8 in the housing 1, firstly, have the filter cylinders 8 respectively deposited in the insert holes 6a of the filter cylinder assembling-and-disassembling mechanism 6 and have the holding member 8a positioned on the filter cylinder assembling-and-disassembling mechanism 6 for fixing the filter cylinders 8 in place. Then, have the filter cylinder assembling-and-disassembling mechanism 6 slidably mounted on the rails 5 and lastly, have a screw 200 inserted through the filter cylinder assembling-and-disassembling mechanism 6 at a location adjacent to the doorway 9 for firmly locking the filter cylinder assembling-and-disassembling mechanism 6 together with the division plate 2. At this time, the holding member 8a of the filter cylinder 8 has its topside closely contact with the underside of the division plate 2. Although the filter cylinder assembling-and-disassembling mechanism 6 in the conventional filter cylinder type dust collector is convenient in assembly and disassembly of the filter cylinder 8, yet, since the rails 5 are an inclined plane, and the filter cylinder assembling-and-disassembling mechanism 6 and the division plate 2 have only one place locked together, the filter cylinder assembling-and-disassembling mechanism 6 is impossible to force the filter cylinders 8 to be tight fit with the division plate 2. As a result, a gap between the division plate 2 and the filter cylinders 8 will be formed and airtight effect will be lowered. Thus, when the filter cylinder type dust collect is started to operate, dust and chips will pass through the gap and the through holes 2a of the division plate 2 and get into the place over the division plate 2 and even adhere to the motor fan 3 to interfere with operation of the motor fan 3 and further, air exhausted out of the air outlet 4 still carries too much dust, failing to attain effect of air filtration. Therefore, the conventional filter cylinder type dust collector is dissatisfactory in quality of use.

In view of the defects mentioned above, the inventor of this invention thinks that the filter cylinder assembling-and-disassembling mechanism 6 of the conventional filter cylinder type dust collector has to be ameliorated and hence devises this invention.

SUMMARY OF THE INVENTION

The objective of this invention is to offer a forcing and fixing structure for the filter cylinders of a filter cylinder type dust collector, convenient for a user to assemble and disassemble plural filter cylinders in a filter cylinder type dust collector and able to surely force the filter cylinders to tight fit with a division plate to attain good airtight effect and enhance efficacy of air purification as well as quality of use of the filter cylinder type dust collector.

The forcing and fixing structure for the filter cylinders of a filter cylinder type dust collector in the present invention includes a dust collector formed with a housing, which has its interior provided with an accommodating space and its topside bored with an air outlet communicating with the accommodating space. The housing of the dust collector further has one side formed with an air intake communicating with the accommodating space and another side assembled with a door plank. The dust collector is installed with a motor fan at an upper side of the accommodating space, and a division plate is provided at an intermediate section of the accommodating space, bored with a plurality of through holes spaced apart. Plural filter cylinders respectively corresponding with the through holes are positioned under the division plate and plural dust collecting barrels are disposed under the filter cylinders. This invention is characterized by plural setting racks, plural forcing rods and plural assembling-and-disassembling plates. The setting racks are in pair and in parallel provided under the division plate and each pair of the setting racks is fixed at two sides of the through hole of the division plate and further, respective setting rack is axially formed with an accommodating groove. The forcing rods corresponding with the setting racks are in pair fitted with the corresponding accommodating grooves of the setting racks, and the sections of the forcing rods are unequal diameter and formed with a major diameter section and a minor diameter section. In addition, the forcing rods respectively have one end vertically connected with a rotary handle, and the rotary handles corresponding with the forcing rods are provided in pair and can be locked in place by a locking member. The assembling-and-disassembling plates are respectively disposed on the twinned forcing rods and respectively bored with plural openings corresponding with the through holes of the division plate for the filter cylinders to be inserted therein.

The forcing and fixing structure for the filter cylinders of a filter cylinder type dust collector in the present invention is to have the twinned rotary handles turned to actuate the forcing rods to rotate and simultaneously, the forcing rods whose sections are unequal diameter will drive the assembling-and-disassembling plate to move upward and force the filter cylinders to tight fit with the division plate, thus enhancing convenience in assembly and disassembly of filter cylinders, attaining good airtight effect and elevating effect of air purification and quality of use of the filter cylinder type dust collector.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
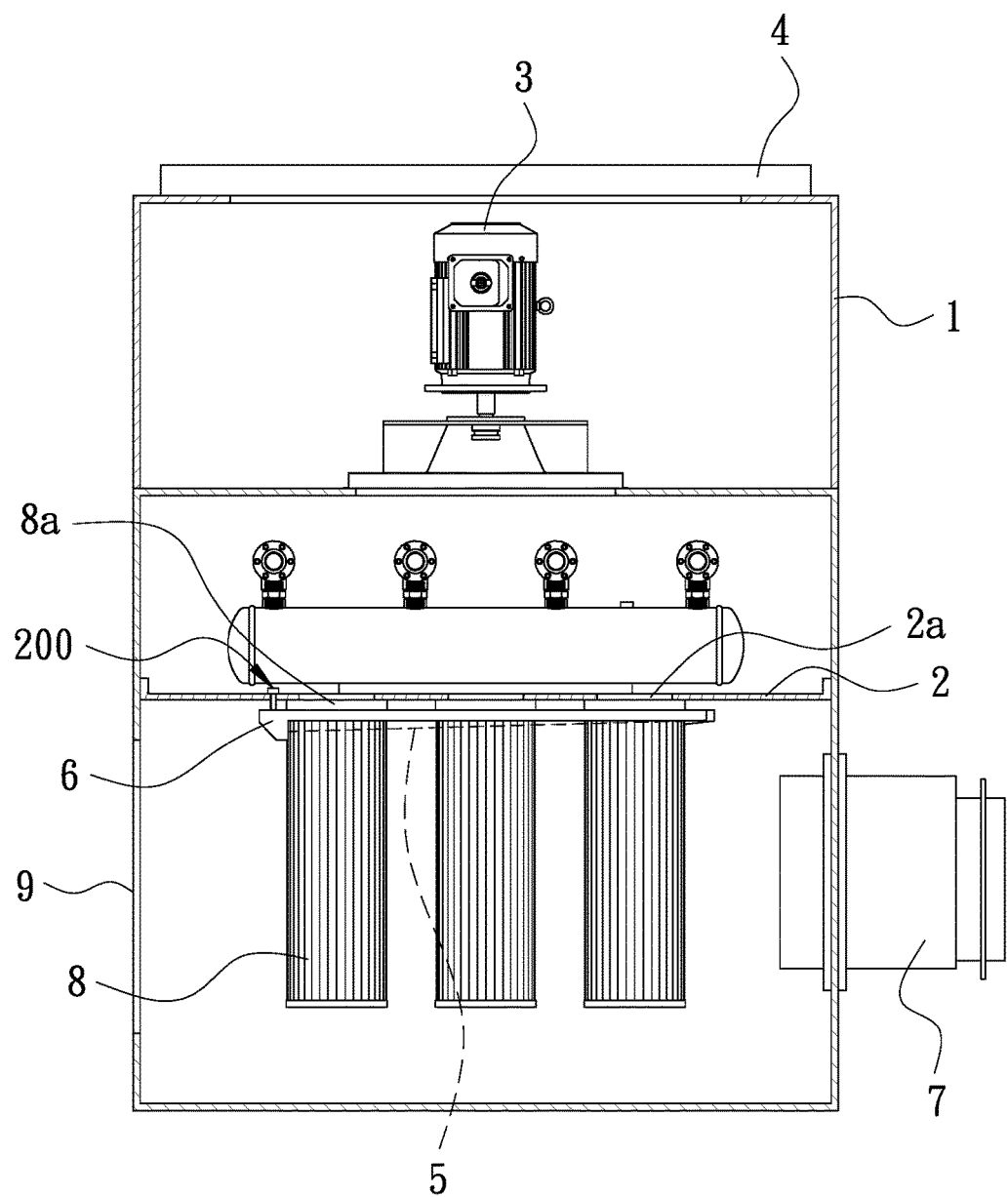
FIG. 1 is an internal structure view of a conventional filter cylinder type dust collector.
Figure 2:
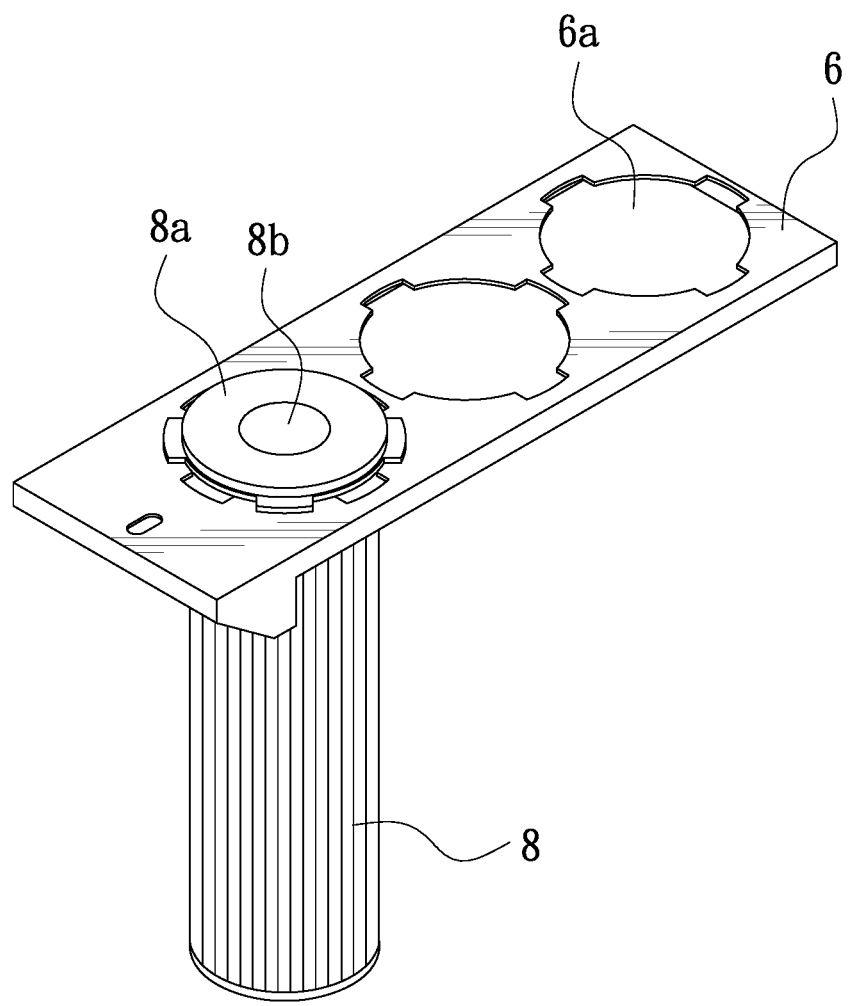
FIG. 2 is a perspective view of a filter cylinder assembling-and-disassembling mechanism of the conventional filter cylinder type dust collector, showing that a filter cylinder is assembled.
Figure 3:
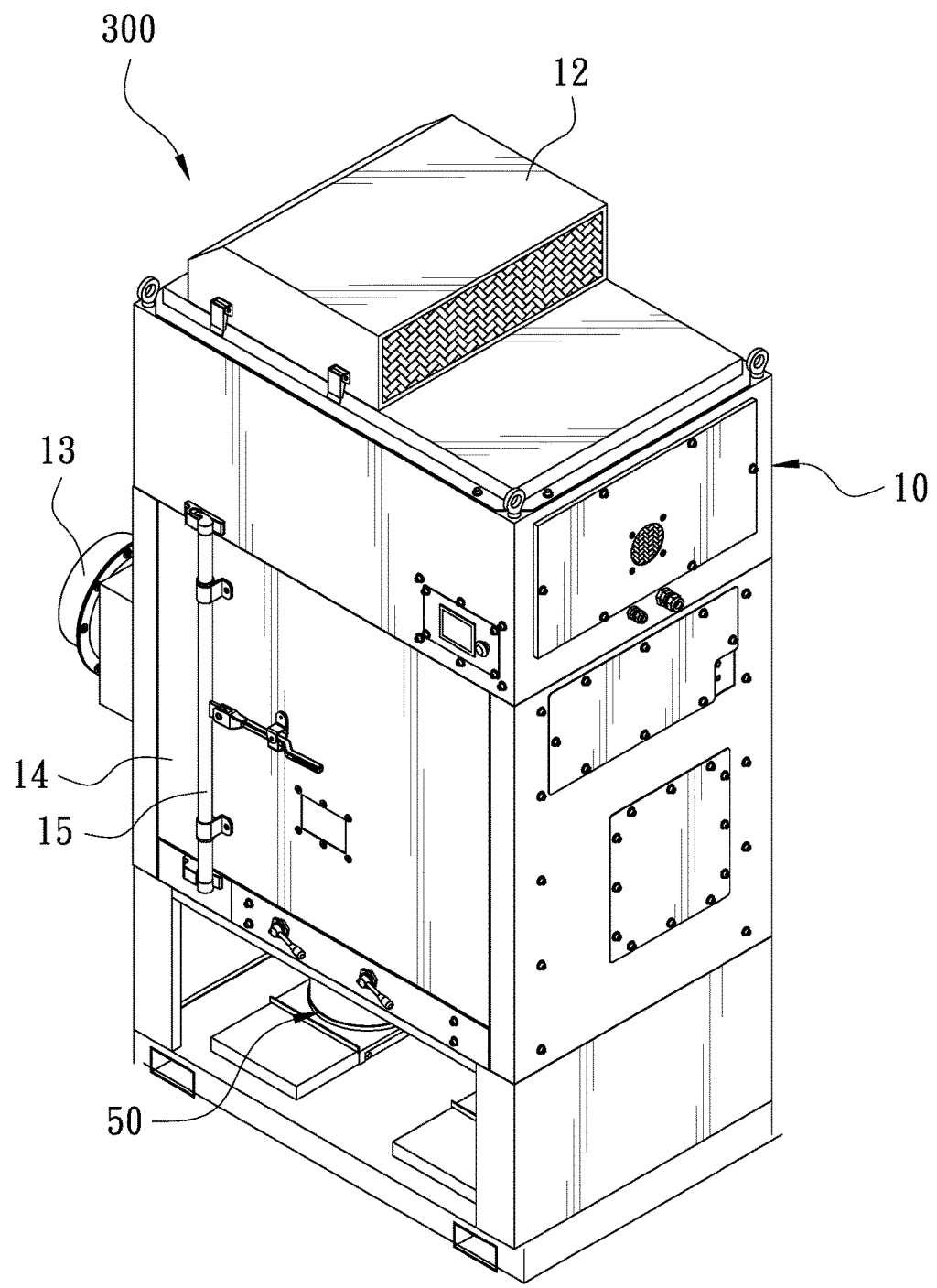
FIG. 3 is an external perspective view of a forcing and fixing structure for the filter cylinders of a filter cylinder type dust collector in the present invention.
Figure 4:
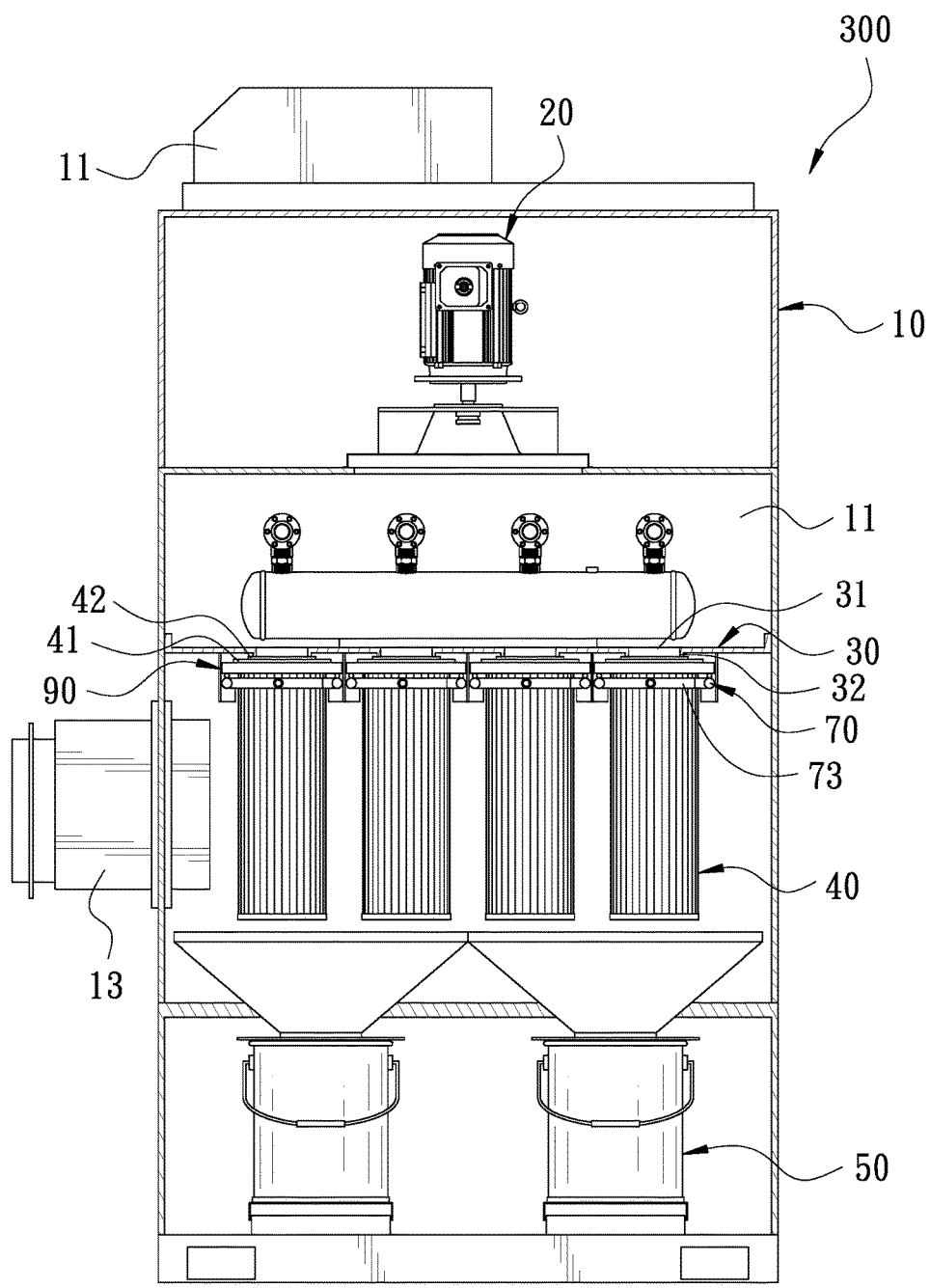
FIG. 4 is an internal structure view of the forcing and fixing structure for the filter cylinders of a filter cylinder type dust collector in the present invention.
Figure 5:
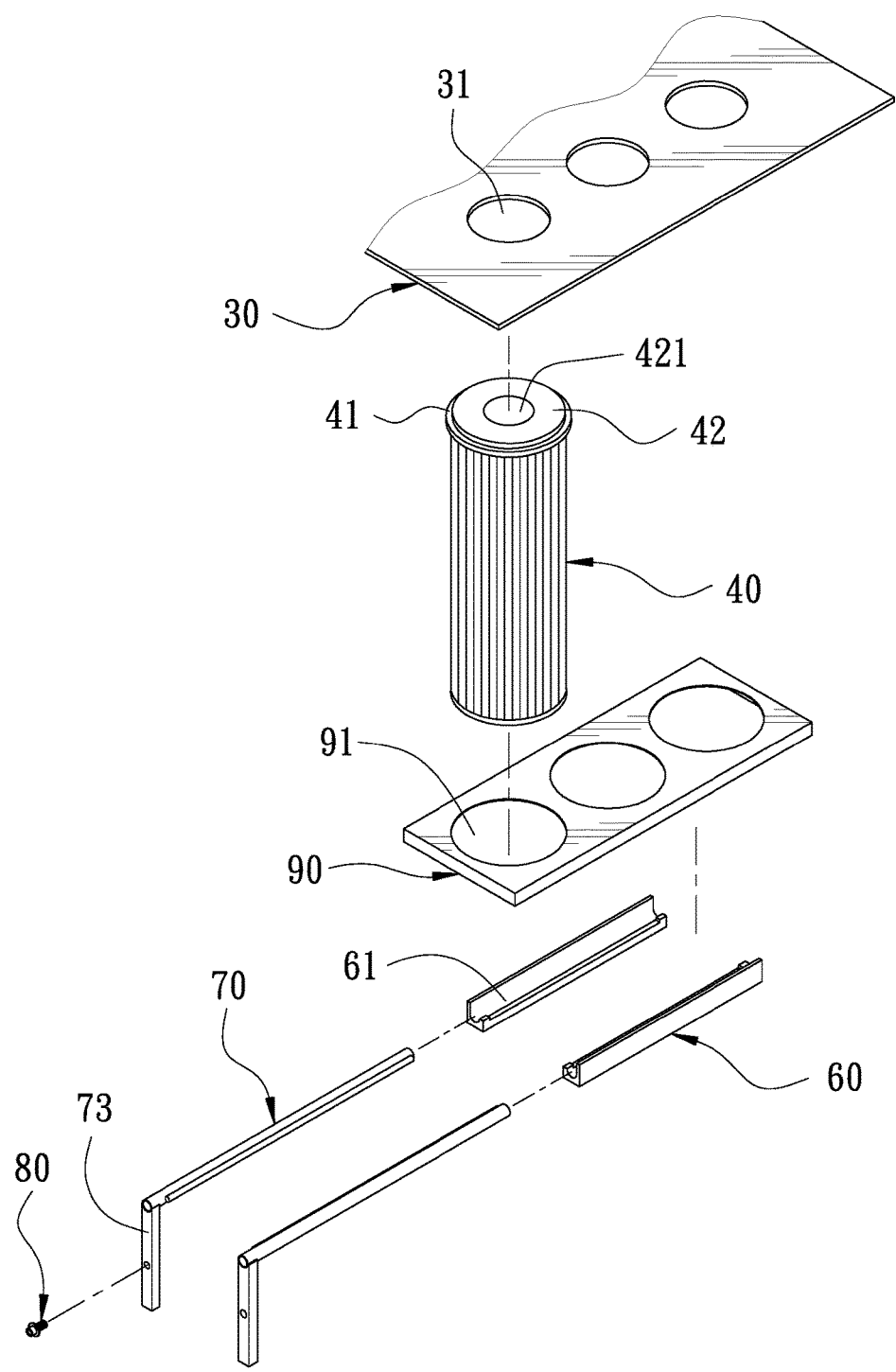
FIG. 5 is a partial exploded perspective view of the forcing and fixing structure for the filter cylinders of a filter cylinder type dust collector in the present invention.
Figure 6:
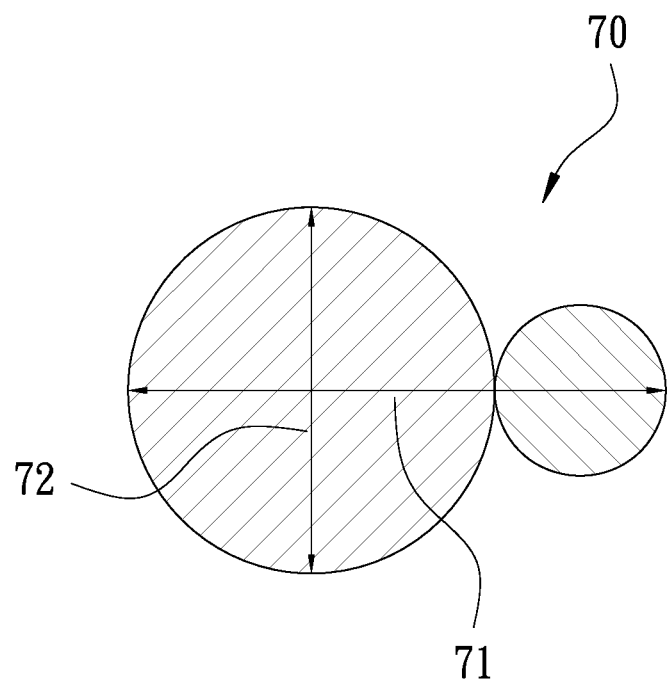
FIG. 6 is a cross-sectional view of a forcing rod in the present invention.

A preferred embodiment of a forcing and fixing structure for the filter cylinders of a filter cylinder type dust collector in the present invention, as shown in FIGS. 3-6, includes a dust collector 300, a plurality of setting racks 60, a plurality of forcing rods 70, a locking member 80 and a plurality of assembling-and-disassembling plates 90 combined together.

The dust collector 300 consists of a housing 10 having its interior formed with an accommodating space and its topside provided with an air outlet 12 communicating with the accommodating space 11. The housing 10 has one side bored with an air intake 13 communicating with the accommodating space 11 and another side provided with a door plank 14 assembled thereon with a container type door handle 15. The accommodating space 11 of the dust collector 300 has an upper side installed with a motor fan 20 and an intermediate section provided with a division plate 30, which is bored with a plurality of through holes spaced apart and in this preferred embodiment, the division plate 30 has its underside provided with a plurality of annular projecting edges 32 respectively positioned at the circumference of the through holes 31. Further, plural filter cylinders 40 respectively corresponding with the through holes 31 are positioned under the division plate 30, and a plurality of dust collecting barrels 50 are provided beneath the filter cylinders 40.

The setting racks 60 are in pair and in parallel provided under the division plate 30, respectively and axially bored with an accommodating groove 61.

The forcing rods 70 corresponding with the setting racks 60 are in pair received in the corresponding accommodating groove 61, and the sections of the forcing rods 70 are unequal diameter and formed with a major diameter section 71 and a minor diameter section 72. Further, the forcing rods 70 respectively have one end vertically connected with a rotary handle 73, and the rotary handles 73 corresponding with the forcing rods 70 are provided in pair and can be firmly locked in place by a locking member 80, which is a screw in this preferred embodiment.

The assembling-and-disassembling plates 90 are respectively fixed on the twinned forcing rods 70 and respectively bored with a plurality of openings 91 corresponding with the through holes 31 for the filter cylinders 40 to be respectively inserted therein.

Figure 7:
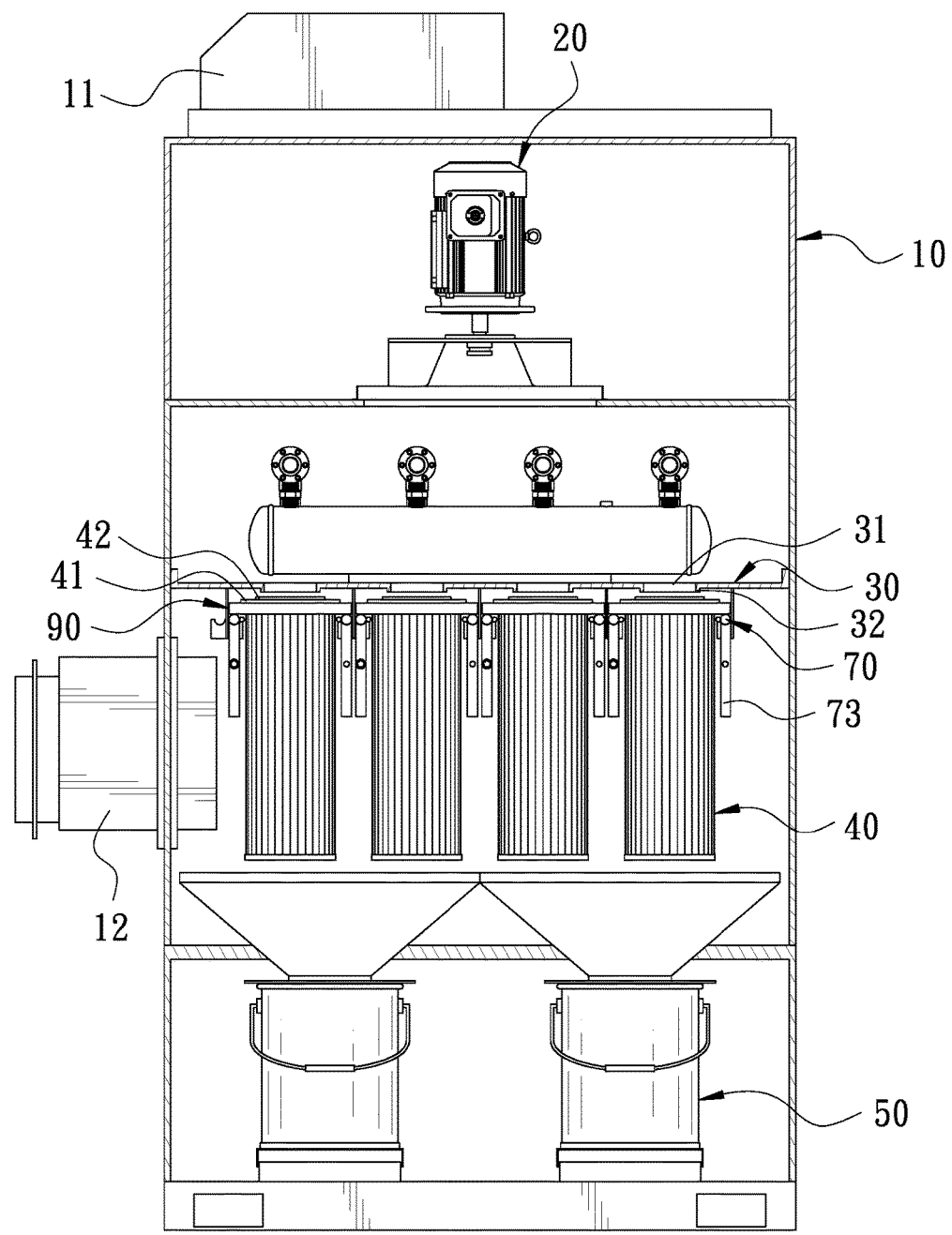
FIG. 7 is an internal structure view of the forcing and fixing structure for the filter cylinders of a filter cylinder type dust collector in the present invention, showing that the filter cylinders are not yet locked in place.
Figure 8:
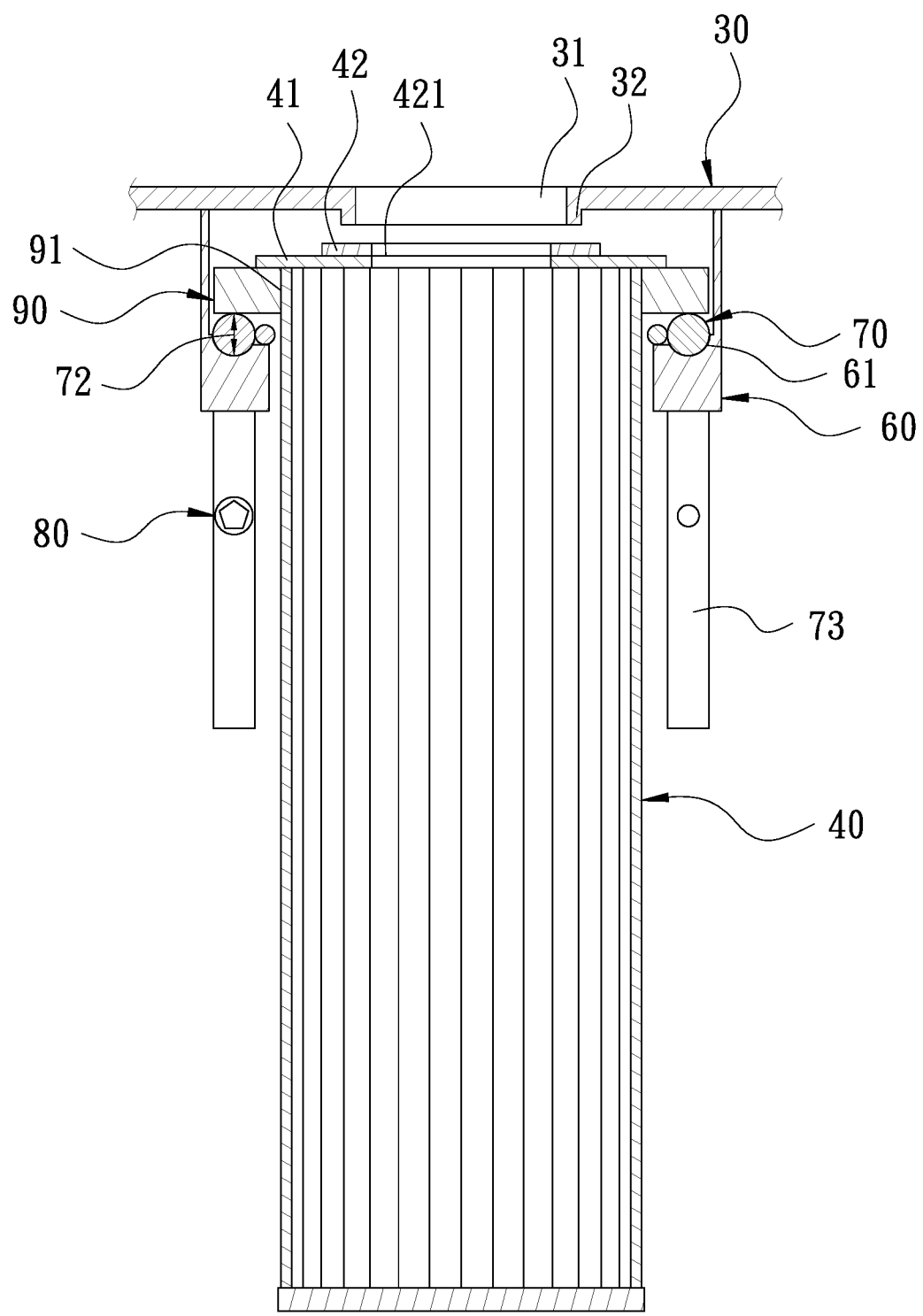
FIG. 8 is a schematic view of the forcing and fixing structure for the filter cylinders of a filter cylinder type dust collector in the present invention, showing that the filter cylinders are not yet locked in place.
Figure 9:
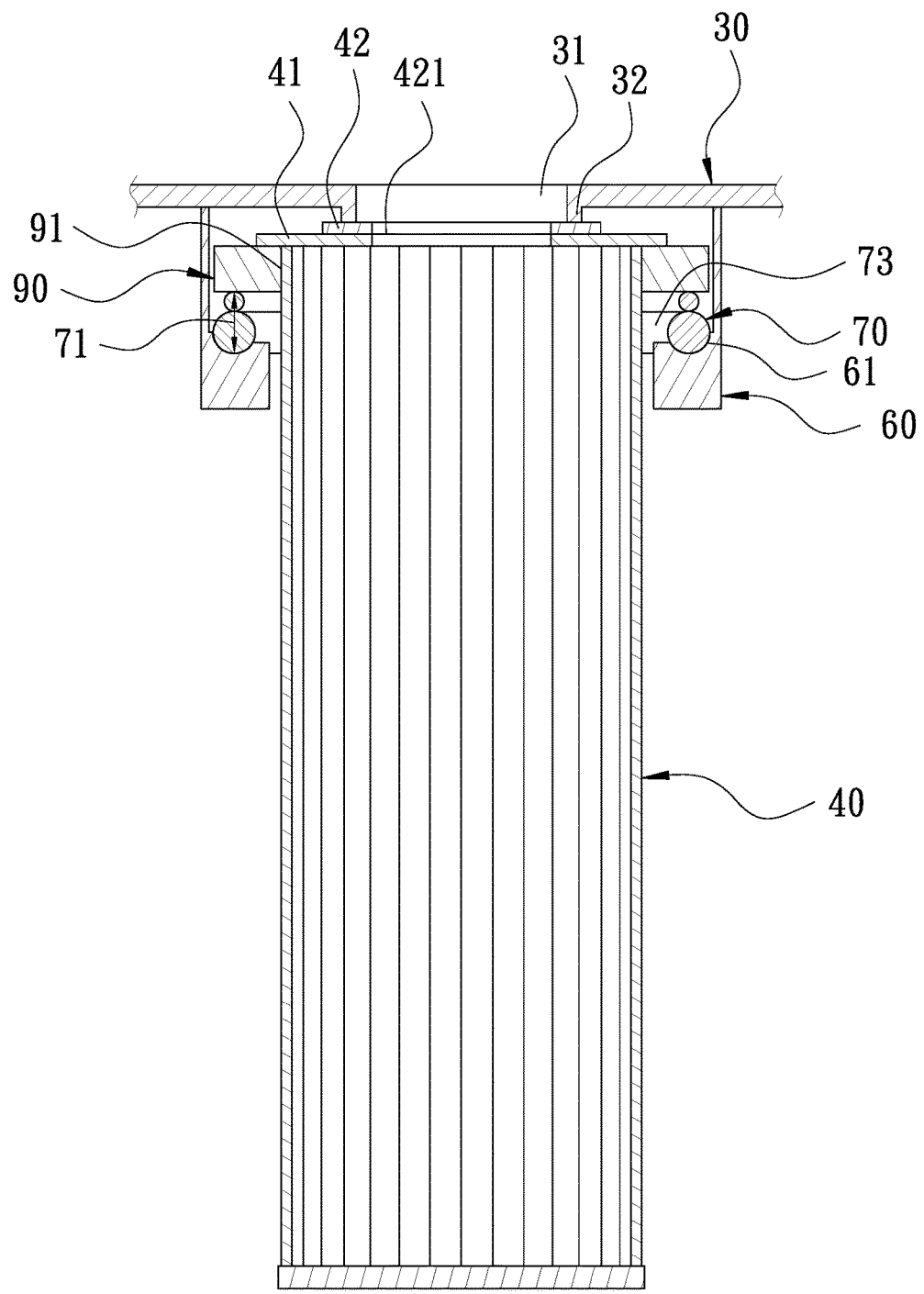
FIG. 9 is a schematic view of the forcing and fixing structure for the filter cylinders of a filter cylinder type dust collector in the present invention, showing that the filter cylinder is locked in place.

For further understanding the structural features, the use and method of technology and the expected effect to be achieved of this invention, the way of use of this invention is stated as follows:

Referring to FIGS. 7-9 as well as FIGS. 3-6, to assemble the filter cylinders 40 in the housing 10, firstly, have the filter cylinders 40 respectively fitted in the openings 91 of the assembling-and-disassembling plates 90. In this preferred embodiment, each filter cylinder 40 has its topside provided with a holding member 42 having an upper side fixed with an airtight member 42, which is foam and which is bored with a through hole 421, the bore size of the through hole 421 being smaller than the through hole 31 of the division plate 30. At this time, the holding member 41 of the filter cylinder 40 is positioned on the assembling-and-disassembling plates 90 for engaging and fixing the filter cylinder 40 in the opening 91. Subsequently, turn the container type handle 15 to open the door plank 14 and have the forcing rods 70 respectively received in the accommodating grooves 61 of the setting racks 60 and thus, the assembling-and-disassembling plates 90 assembled with the filter cylinders 40 can be placed in the housing 10. When the rotary handles 73 of the forcing rods 70 are not yet locked in place, referring to FIGS. 7 and 8, the assembling-and-disassembling plates 90 are laid on the twinned forcing rods 70, and a gap is formed between the filter cylinder 40 and the division plate 30. At this time, a user can turn the twinned rotary handles 73 to actuate the forcing rods 70 to rotate and force the assembling-and-disassembling plates 90 to move upward. When the forcing rods 70 are rotated and their major diameter sections are perpendicular to the underside of the assembling-and-disassembling plates 90, the topside of the airtight member 42 of the filter cylinder 40 will be forced to tight fit with the annular projecting edge 32 of the division plate 30 and then, have the twinned rotary handles 73 of the forcing rods 70 firmly locked in place by the locking member 80. Thus, an airtight and seamless state can be maintained between the filter cylinder 40 and the division plate 30 so that when the dust collector 300 is operated, dust and chips sucked in through the air intake 13 will be impossible to pass through the division plate 30 and be exhausted out of the air outlet 12.

To replace or wash clean the filter cylinders 40, only unscrew the locking member 80 and turn the twinned rotary handles 73 to actuate the forcing rods 70 to rotate, letting the assembling-and-disassembling plate 90 move downward. When the minor diameter sections 72 of the forcing rods 70 are perpendicular to the underside of the assembling-and-disassembling plates 90, as shown in FIG. 8, the assemblingand-disassembling plate 90 assembled thereon with the filter cylinders 40 can be removed out of the housing 10.

Thus, when the filter cylinder 40 are to be assembled in or disassembled from the dust collector 300, the twinned rotary handles 73 are turned to actuate the forcing rods 70 to rotate and force the filter cylinders 40 to tight fit with the division plate 30 by the unequal diameter twin forcing rods 70. By so designing, this invention is able to enhance convenience in assembly and disassembly of filter cylinders, attain good airtight effects and further enhance efficacy of air purification and quality of use of the filter cylinder type dust collector.

While the preferred embodiment of the invention has been described above, it will be recognized and understood that various modifications may be made therein and the appended claims are intended to cover all such modifications that may fall within the spirit and scope of the invention.

What is claimed is:

1. A dust collector comprising-:
    a housing, said housing formed with an accommodating space in the interior, said housing having a topside provided with an air outlet communicating with said accommodating space, said housing having one side bored with an air intake communicating with said accommodating space, said housing having another side provided with a door plank,
    said dust collector further comprising a motor fan at an upper side of said accommodating space, said accommodating space having an intermediate section fixed with a division plate, said division plate bored with a plurality of through holes, plural filter cylinders disposed under said division plate at locations respectively corresponding to said through hole, plural dust collecting barrels positioned under said filter cylinders, wherein the dust collector further comprises:
    a plurality of setting racks being in pair and in parallel provided under said division plate, each pair of said setting rack set at two sides of said through hole, each said setting rack axially formed with an accommodating groove;
    a plurality of forcing rods corresponding with said setting racks, said forcing rods being in pair received in said accommodating grooves of said setting racks, sections of said forcing rods being unequal diameter and formed with a major diameter section and a minor diameter section, said forcing rods having their ends respectively and vertically provided with a rotary handle, said rotary handles corresponding with said forcing rods and provided in pair, said rotary handles able to be locked in place by a locking member; and
    at least one assembling-and-disassembling plate fixed on said pair of forcing rods, said assembling-and-disassembling plate bored with plural openings respectively corresponding with said through holes of said division plate, said filter cylinders respectively inserted in said openings;
    thus, said forcing rods able to be actuated to rotate by turning said rotary handles, said assembling-and-disassembling plate actuated to move upward by said forcing rods when the major diameter sections of said forcing rods are perpendicular to the underside of said assembling-and-disassembling plate, letting topsides of said filter cylinders forced to fit with the division plate and having twinned said rotary handles locked in place by said locking member, able to maintain a fitting and airtight state between said filter cylinder and said division plate.

2. The dust collector as claimed in claim 1, wherein said filter cylinder has an upper side provided with a holding member to have said filter cylinder engaged in said through hole of said division plate.

3. The dust collector as claimed in claim 2, wherein said holding member of said filter cylinder has an upper side provided with an airtight member, said airtight member bored with a through hole, bore size of said through hole of said airtight member being smaller than said through hole of said division plate, said division plate having an underside formed with a plurality of annular projecting edges respectively corresponding to said airtight members.

4. The dust collector as claimed in claim 3, wherein said airtight member is foam.

5. The dust collector as claimed in claim 1, wherein said door plank has a container type handle fixed thereon.

6. The dust collector as claimed in claim 1, wherein said locking member is a screw.

* * * * *